Patented Apr. 17, 1951

2,549,526

UNITED STATES PATENT OFFICE 2,549,526

PROCESS FOR RECOVERY OF VEGETABLE PROTEIN

Stewart Rowe, Cincinnati, Ohio, assignor, by mesne assignments, to Buckeye Cotton Oil Company, Memphis, Tenn., a corporation of Ohio No Drawing. Application December 15, 1947, Serial No. 791,943

12 Claims. (Cl. 260—123.5)

The present invention relates to improvements in the process of recovering protein from oleaginous seed material, and more particularly to facilitating the filtration of the extracted and precipitated protein.

The recovery of protein from oleaginous seed material is commonly accomplished by an alkaline extraction of meal or flakes containing the protein, from which meal or flakes the oil has been largely removed by expression or by treatment with an oil-solvent. A well-known and favored procedure has been to crush the seed into flakes, to extract the oil from the flakes with an oil-solvent such as petroleum ether, to extract the protein from the substantially oil-free flakes with an aqueous alkaline solution, to separate the soluble protein extract from the insoluble flakes and other insoluble matter by screening, filtering, centrifuging, or settling and decanting, to precipitate the protein from the protein-rich extraction liquor by acidifying, to filter the precipitated protein, and finally to granulate and dry the filter cake.

Many variations in this customary procedure may be practiced. Thus the extraction of the protein may, if desired, be preceded by washing the meal with water at the isoelectric point of the desired protein in order to eliminate undesired soluble constituents. The extraction of the protein by alkali may be accomplished batch-wise or continuously, by single or multiple extraction, in series or counter-current, according to known methods, and in some cases it may be preceded, accompanied or followed by a partial hydrolysis of the protein in order to render the same suitable for the particular purpose for which it is intended. The extracted protein may be precipitated by batch-wise or continuous addition of an acidic agent until the isoelectric point, or thereabouts, of the protein is reached. The isoelectric point, which is the optimum for the precipitation of the protein, varies somewhat for various proteins but is in general about pH 4 or slightly higher, depending somewhat upon the source of the protein, temperature, concentration of salts, and other factors. The precipitated protein, with or without intervening washings, may be concentrated by settling or otherwise to a concentration suitable for filtration, usually to about 4 per cent to about 12 per cent solids, the concentrated slurry being then filtered by conventional means, such for example as a continuous rotary vacuum filter.

Heretofore the filtration step has been difficult and time-consuming because of clogging of the filter.

It is an object of the present invention to facilitate and accelerate the filtration of the precipitated protein thereby obtaining the protein in a physical form suitable for granulating and drying. It is another object to provide an improved process for the recovery of oleaginous seed protein from any aqueous alkaline solution thereof.

I have found that these objects can be accomplished without denaturing the protein or rendering it less soluble, if, in the process of extracting the protein with alkali and precipitating it with acid, I condition the protein for rapid filtration by forming a gelatinous precipitate of heavy metal hydroxide or hydrated oxide in the presence of the precipitated protein, this formation of the gelatinous hydroxide precipitate occurring either simultaneously with or subsequently to the precipitation of the protein. Although in themselves these gelatinous hydroxide precipitates are as a rule hard to filter, I find that if co-formed with, or formed in the presence of the protein precipitate, the mixture filters more readily than does either precipitate alone.

In order to form the gelatinous precipitate in such a way as to be most effective in conditioning the protein for rapid filtration, I add to the protein-containing liquor (by which I mean either a solution of the protein or a liquor containing precipitated protein) one or more heavy-metal-containing inorganic salts, or the heavy metals from which these salts are derived, at one or more of certain stages in the customary recovery process described above. The salts which are suitable for this purpose are those which form gelatinous precipitates of heavy-metal hydroxide over the pH range from about 3.6 to about 4.5, this being the pH range within which the mixed precipitated protein and heavy metal hydroxide are readily filtered and therefore the range preferred for precipitation. At pH values above this range, the amount of protein precipitated falls off markedly and filtration of the mixed precipitate is slower. At lower pH values also the yield of precipitated protein is poor and recovery thereof is industrially impractical, whether with or without treatment with heavy metal compounds. Adding the salts herein described according to my invention may alter the pH of the system but it does not appear to alter the pH range within which filtration is fastest and easiest, the optimum being from about 3.8 to about 4.1 pH. All pH values given herein for the acid precipitating liquor refer to determinations at temperatures representative of industrial plant operation, not substantially exceeding 115° F. These acid liquors containing precipitated protein normally increase in pH by not more than 0.004 unit per degree Fahrenheit decrease in temperature.

Heavy-metal-containing salts which form gelatinous precipitates over the pH range from 3.6 to 4.5 and which are therefore useful in the practice of my invention are metal salts of certain amphoteric hydroxides such as sodium aluminate, sodium stannate, sodium stannite, and the corresponding salts in which other alkali metals are substituted for sodium, and certain other heavy metal salts such as the sulfates, chlorides and nitrates of indium, gallium, aluminum, trivalent chromium, divalent and trivalent iron, and divalent and tetravalent tin. The term "heavy metal" is herein used to designate any metal other than an alkali metal or an alkaline earth metal.

Instead of using simple heavy metal salts for obtaining the desired gelatinous precipitates, double salts may be used corresponding to and including potash alum and having the general formula:

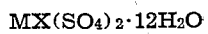

$$MX(SO_4)_2 \cdot 12H_2O$$

in which M is an alkali metal, the term being used herein to include ammonium as well as sodium, potassium, lithium, rubidium or caesium, and in which X is aluminum, chromium or iron.

In order properly to condition the precipitated protein for rapid filtration, the salts which I have described should be added at such a stage in the process that the precipitation of the protein will either proceed with or precede the formation of the gelatinous heavy metal hydroxide precipitate. It is commonly found that if the gelatinous precipitate forms from the salt prior to the precipitation of the protein, less improvement in filtration results. In general, adding pre-formed gelatinous precipitate of heavy metal hydroxides to precipitated protein is not appreciably helpful.

All of the salts which are useful in the practice of my invention may be added to the acid protein-containing liquor as soon as the pH of same has been reduced to within the pH range between about 3.6 and about 4.5, or at any time thereafter prior to filtration. The salts of aluminum and tin may alternatively be added to the aqueous alkaline solution which is to be used for extracting protein from the vegetable seed, or they may be added to the protein-containing alkaline liquor after extraction; in both of these cases, alkali-soluble aluminates, stannates or stannites are formed in situ, and are later precipitated when the solution is acidified. Iron salts, however, and those salts which are insoluble in, or which form insoluble hydroxides in, the alkaline extraction liquor should not be added until after the beginning of precipitation of the protein in the acidification step. Since the alums and the chlorides, sulfates and nitrates of aluminum, iron and chromium are soluble at some pH values below 3.6, the protein-containing liquor may if desired be acidified to these low pH values and these salts may then be added, but in such cases the pH must subsequently be adjusted upward to between 3.6 and 4.5 in order to obtain the desired precipitation of protein and of the heavy metal hydroxide. In general I prefer to add all of the salts herein described to the acid slurry of precipitated protein after it has been concentrated or thickened, before final filtration.

The amount of acid which must be added to the alkaline solution of protein in order to reduce the pH to the desired range for precipitating the protein may be influenced by the salts added. Furthermore, after the pH has been adjusted to within this desired pH range, subsequent addition of the salts may raise the pH above 4.5 or may lower it below 3.6, depending upon the kind and amount of salt, and in such cases the pH of the precipitation liquor must be restored to within the 3.6 to 4.5 range.

All of the salts suitable for practicing my invention may be added to the protein-containing liquor either in dry form or as hydrated crystals, or they may if desired be dissolved before adding. Thus stannic chloride, the alums, and the chlorides, sulfates, and nitrates of aluminum, divalent and trivalent iron and trivalent chromium may be added as aqueous solutions, the alkali metal salts of amphoteric hydroxides as alkaline aqueous solutions, and ferric sulfate and ferrous, stannous and stannic chlorides as alcoholic solutions. As hereinbefore indicated, the salts may be formed in situ. Thus Example 3 below illustrates the formation in situ of an alkali metal salt of an amphoteric hydroxide by reaction of alkali with a salt of an amphoteric metal. Such salts of amphoteric hydroxides may also be formed in situ by adding metallic aluminum or tin in finely divided form to the strongly alkaline solution either before or after the protein has been extracted therewith. Likewise, heavy metal salts of strong acids may be formed in situ in the acid liquor containing dissolved protein. Thus I may add a heavy metal and a strong acid to the system after the protein has been precipitated, as for example by adding aluminum, chromium or iron filings or powder and an excess of hydrochloric acid, thereby forming the corresponding chlorides of aluminum, chromium or iron in situ in the presence of dissolved protein. I may also form the heavy metal salts of strong acids in situ in acid liquor containing dissolved protein by adding an excess of strong acid and a salt of the heavy metal with a weak acid, as for example iron sulfide and hydrochloric acid. Likewise I may add an alkali metal salt of an amphoteric hydroxide and an excess of a strong acid, as for example by adding sodium aluminate and sulfuric acid. With stannous chloride I have obtained better results if an alcoholic solution, rather than an aqueous solution or suspension, is used. Presumably this is because stannous hydroxide is precipitated almost immediately when the chloride comes into contact with water, and hence if a previously prepared solution in water is used it is in reality the pre-formed hydroxide which is added. As previously stated, the pre-formed heavy metal hydroxides are not recommended.

I have obtained better results by adding the heavy metal salts to the protein-containing liquor after acidulation rather than by dissolving them in the acid which is later to be used for precipitating the protein.

With aluminum sulfate solutions, I have obtained better results with solutions which had aged for an hour or more than with fresh solutions. The following table illustrates this in the case of protein which was extracted from soybean flakes with alkali. The protein was precipitated from its alkaline solution by acidifying the latter to a pH of 4.4. The slurry was settled and decanted, and was then treated with a 20 per cent aluminum sulfate solution before filtration in a standardized manner.

Table I

| $Al_2(SO_4)_3 \cdot 18 H_2O$ (based on wt. of protein) | Age of $Al_2(SO_4)_3$ Solution before Use | Time Required for Filtration |
|---|---|---|
| Per cent | | Minutes |
| 4.0 | Fresh | 15 |
| | 2 hrs | 4.75 |
| | 4 hrs | 4.25 |
| | 8 hrs | 4.75 |
| | 25 hrs | 5.50 |
| 8.0 | Fresh | 6.50 |
| | 2 hrs | 2.25 |
| | 4 hrs | 2.25 |
| | 8 hrs | 2.25 |
| | 25 hrs | 3.0 |

Thorough mixing is required in order to promote coagulation of the precipitated protein and the gelatinous precipitate from the added salt. Best results are obtained if the two types of precipitate just mentioned remain in contact with one another for a time before filtration. Moderate increase in age of precipitate and time of contact, i. e. the time interval between mixing and filtration, facilitates coagulation and increases the speed of filtration. Preferably at least five minutes' aging is allowed. Thus in a preferred method of practicing my invention the acid slurry of precipitated protein is centrifuged, or is settled and decanted, to a concentration of from about 4 per cent by weight to about 8 per cent by weight of protein solids, a solution of aluminum sulfate is added, the thickened slurry is mixed thoroughly by being circulated through a gear pump and is then held for at least five minutes with mild agitation before filtration begins.

The desired improvement in filtration can usually be effected by adding from about 0.5 per cent to about 15 per cent of the anhydrous salts hereinbefore described. These percentages are based on the dry weight of the protein present, which can be estimated in advance by chemical analysis or on the basis of previous experience with the meal to be treated or by centrifuging a small sample of the slurry containing the precipitated protein and drying and weighting the resulting cake. Adding less than about 0.5 per cent salt is relatively ineffective, while little further improvement results from adding more than 15 per cent. I therefore prefer to use from about 0.5 per cent to about 15 per cent of the salt. In commercial protein recovery operations, the use of from about 4 per cent to about 10 per cent $Al_2(SO_4)_3 \cdot 18H_2O$ has given most satisfactory results.

The following examples illustrate in greater detail methods which I use in practicing my invention.

Example 1.—Substantially oil-free soybean flakes were mixed with 15 times their weight of water, together with enough sodium hydroxide to maintain the pH at 9.0 when measured at 120° F. After 30 minutes extraction at 120° F., the undissolved flakes were screened out and the protein in the extraction liquor was precipitated by adding enough sulfuric acid of approximately 10% concentration to reduce the pH to 4.1 at 110° F. The resulting thin slurry was settled for 18 hours at 110° F. to a concentration of about 10% protein solids and was decanted. To an amount of the thickened slurry containing 100 parts by weight of protein solids, there was added 6 parts by weight of $Al_2(SO_4)_3 \cdot 18H_2O$ crystals in the form of a 20% solution, the pH of the slurry being thereby reduced to 3.3. Dilute sodium hydroxide was added with thorough mixing in order to restore the pH to 4.1 at 110° F. Five hundred cubic centimeters of this slurry was then filtered through paper in an 11 cm. Büchner funnel, the time required for filtration being less than half as long as that required for filtering 500 cc. of a corresponding slurry to which no aluminum sulfate or sodium hydroxide was added.

In Example 1, a heavy metal salt was added to the thickened slurry after decanting off the supernatant liquor and prior to filtering. The filtration time can be reduced still more if the slurry is washed by adding fresh water after adding the aluminum sulfate, and is then stirred, settled and decanted a second time before filtering.

Example 2.—Substantially oil-free soybean flakes were extracted with caustic soda solution as in Example 1 and the protein was precipitated from the extraction liquor as in that example, enough sulfuric acid being used to reduce the pH to 4.5 at 110° F. The resulting thin slurry was settled for 18 hours at 110° F. to a concentration of about 8% solids and was decanted. To an amount of the thickened slurry containing 100 parts by weight of protein solids there was added 5 parts by weight of $AlCl_3 \cdot 6H_2O$ crystals in the form of a 20% solution, the pH of the slurry being thereby reduced to 4.0 at 110° F. After thorough mixing, 500 cc. of the slurry was filtered as in Example 1, the time required being only one third as long as that required for filtering 500 cc. of a corresponding slurry to which no aluminum chloride was added.

Example 3.—Substantially oil-free soybean flakes were mixed with 14 times their weight of water containing 0.15% by weight of aluminum sulfate and enough sodium hydroxide to maintain the pH at 8.5, measured at 120° F. This amount of aluminum sulfate was equal to about 4.2% by weight of the protein present in the flakes. After 30 minutes extraction at 120° F. the undissolved material was removed by screening and the protein and aluminum hydroxide were precipitated from the alkaline extract by adding sulfuric acid, with mixing, to a pH of 4.1 at 110° F. The slurry was allowed to settle for 18 hours at 110° F. to a concentration of about 5% solids, and the supernatant liquor was decanted. Five hundred cc. of the thickened slurry was filtered as an Example 1, the time required being about one fourth as long as that required for filtering 500 cc. of a corresponding slurry to which no aluminum sulfate was added.

In Example 3 an alkali metal aluminate was formed in situ in the alkaline liquor which was to be used in extracting protein from the vegetable seed material.

Example 4.—Substantially oil-free soybean flakes were extracted with caustic soda solution, the protein was precipitated from the extract, and the slurry was concentrated, all as in Example 1. There was then added to the thickened slurry an amount of sodium aluminate equal to 3.0% by weight of the protein present. After thorough mixing the pH was found to be 4.3. Aluminum sulfate in an amount equal to 4% by weight of the protein present was added as an aqueous solution, thereby reducing the pH to 3.9. After thorough mixing, 500 cc. of the slurry was filtered as in Example 1. A dry filter cake was obtained in less than one fourth of the time required for filtration in a blank run in which no aluminum salts were used.

*Example 5.*—Substantially oil-free soybean flakes were extracted with alkali as in Example 1. The protein was precipitated by adding sulfur dioxide gas to the protein solution until the pH decreased to 2.6 at 110° F. The slurry was settled for 18 hrs. at 110° F. to a 5% solid content and was decanted. Into the thickened slurry, a 10% solution of sodium stannite was mixed until the pH was raised to 4.1. Five hundred cubic centimeters of the slurry was then filtered as in Example 1, the time required being only one fourth of the time required in filtering a corresponding slurry in which no sodium stannite was used.

*Example 6.*—Substantially oil-free soybean flakes were extracted with alkali, the protein was precipitated, and this was followed by settling for 18 hours at 110° F. and decanting, all as in Example 1. To the thickened slurry, 1% ferric chloride, based on the weight of the protein present, was added as a 20% solution in water. The pH was reduced to 4.0 thereby. After agitating thoroughly, 500 cc. of the slurry was filtered as in Example 1. A dry filter cake was obtained in only one fifth of the time required for filtering in like manner an equal amount of a corresponding slurry in which no ferric chloride was used.

*Example 7.*—Substantially oil-free soybean flakes were extracted and precipitated as in Example 1, followed by settling for 18 hours at 110° F. and decanting. To the thickened slurry, 8% chromic chloride, based on the weight of the protein present, was added as a 20% solution in water. The pH was reduced thereby to 3.95. After thorough agitation, 500 cc. of the slurry was filtered as in Example 1. A dry filter cake was obtained in about two thirds of the time required for filtering in like manner an equal amount of a corresponding slurry in which no chromic chloride was used.

*Example 8.*—Soybean flakes were extracted with an oil-solvent until their residual oil content was less than 1% by weight. They were then mixed with 14 times their weight of water containing enough sodium hydroxide to maintain the pH at 8.3 when measured at 120° F. After 30 minutes extraction at 120° F. the liquor was clarified by screening and centrifuging, and the protein in the liquor was precipitated at 115° F. by treatment with sulfur dioxide gas until a pH of 5.0 was reached and then with sulfuric acid to a final pH of 4.4 at 115° F. After settling and decanting, 9 parts by volume of a 20% solution of stannous chloride in ethyl alcohol was stirred into 500 parts by volume of the slurry containing 5% solids. The pH was thereby reduced to 4.0. Five hundred cubic centimeters of the resulting slurry was filtered as in Example 1. The time required was about one third as long as was required for like filtration of a slurry which was precipitated with sulfuric acid, settling, decanting and filtering being all at pH 4.0, and no stannous chloride being used.

*Example 9.*—Substantially oil-free peanut flakes were mixed with 10 times their weight of water containing enough sodium hydroxide to hold the pH at 8.3, measured at 120° F. After 30 minutes agitation at 120° F. the insoluble material was screened out and the extract was clarified centrifugally. The extract, which had cooled during centrifuging, was reheated to 110° F. and the pH was adjusted to 4.3 by adding a 7% solution of sulfuric acid. The precipitated protein was settled and the supernatant liquor was decanted, leaving a 6% solids slurry. An amount of $Al_2(SO_4)_3 \cdot 18H_2O$ equal to 3.3% by weight of the protein present was dissolved in water and was added to the slurry, thereby reducing the pH to 3.7. Five hundred cc. of the slurry was filtered as in Example 1. The time required was about one third of the time required for like filtration of a corresponding slurry in which no aluminum sulfate was used.

*Example 10.*—Substantially oil-free cottonseed flakes were extracted with alkali as in Example 9. After screening out the insolubles, the alkaline extract was divided into two equal parts, the first part being acidified to pH 4.6 and the second part to a pH of 4.2 with sulfuric acid. After settling overnight at 110° F. and decanting to about 10% solids, the pH values of the two slurries had dropped to 4.1 and 3.9 respectively, due to bacterial action. To the first batch, 1.5% aluminum sulfate, based upon the weight of protein present, was added, while nothing was added to the second batch. (The pH of both batches was thereby brought to substantially the same value, any minor difference still existing being without significance in the course of the experiment.) Both batches were stirred and filtered similarly, as in Example 1. Filtration time was less than half as long as in the case of the batch which was conditioned with aluminum sulfate.

While I have described and illustrated my invention as if the process were batch-wise, I do not limit myself thereto, for it will be understood that the invention may be practiced as a continuous process if desired. Thus instead of batch-wise addition of the salt to the liquor containing the protein, I may mix a continuously flowing stream of the one with a continuously flowing stream of the other, or I may lead the two continuously flowing streams into a mixing tank from which the precipitated slurry is being constantly withdrawn, or I may practice other modifications of the process in order to make it continuous.

It is to be understood that the scope of my invention is not limited to these or other methods of mixing the salt and the protein, nor is it limited as to methods or means of concentrating or filtering. It may be practiced with proteins derived from any oleaginous seed material, such as that from soybeans, peanuts, castor beans, linseed and the like. Any suitable means may be used for previously removing substantially all of the oil from such seed material, for example extraction with an oil-solvent or expression.

The details of the step wherein the protein is extracted from substantially oil-free seed material form no part of the instant invention, conventional agents and conditions being employed. Thus I may employ an aqueous solution in suitable concentration of any agent commonly used for the purpose, such as sodium hydroxide, potassium hydroxide, calcium hydroxide, ammonium hydroxide, substituted ammonium hydroxides such as trimethyl benzyl ammonium hydroxide, amines such as triethylamine and the mono-, di- and tri-ethanolamines, and alkaline salts such as sodium carbonate, sodium sulfite and borax. I may also employ salt solutions such as sodium chloride, sodium sulfate, and calcium chloride, adjusting the pH value to the desired point with alkali. As it well known, the conditions of the reaction, such as temperature, time, concentration of reagents, etc., may be varied to a considerable extent without materially affecting the characteristics of the end product, particularly if several factors are varied simultaneously. In general, however, I prefer to extract the protein at relatively low temperature, such as about 115° to 125° F., for if high temperatures are reached at any time in the processing of the seed material or of the protein, partial denaturing of the protein may occur and its solubility be decreased. Furthermore, although extraction of the protein may be carried out at any pH above the isoelectric point of the protein, satisfactory yields require a pH of at least 6, and in general I prefer to extract at a pH of about 8 or 9, as illustrated by the examples hereinbefore given.

As previously noted, the protein may be precipitated from its alkaline solution by adding any suitable acid-reacting agent. Strong mineral acids such as hydrochloric, sulfuric or nitric acids, acid salts such as sodium acid sulfate, and acid-forming gases such as sulfur dioxide or chlorine are suitable for this purpose. In general I have found that if the acidification is carried out wholly by adding the acid-reacting heavy metal salts, such as aluminum chloride or ferric chloride for example, the quantities of these salts required are so large that an excessive amount of heavy metal hydroxide forms when the pH falls to below about 4.5, and filtration time is not materially reduced thereby. Hence I prefer that the acidification be to a large degree carried out by adding acidic agents other than the salts which are the source from which the heavy metal hydroxides are later to be formed. Furthermore, it is advisable to avoid the presence of ions, such for example as citrate, tartrate, oxalate or acetate, which might by complex ion formation or otherwise interfere with the precipitation of the heavy metal hydroxides, or of ions such as orthophosphate, pyrophosphate or sufide which might precipitate the heavy metals.

Having thus described my invention, what I claim and desire to secure by Letters Patent is:

1. In the process of recovering oleaginous seed protein from an aqueous alkaline solution thereof, which process comprises acidifying the solution to precipitate the protein, and filtering off the precipitated protein, the improvement which comprises conditioning the precipitated protein for rapid filtration by incorporating a heavy-metal-containing inorganic salt with the protein-containing liquid to form therein, at any time prior to filtration of the protein and not prior to precipitation of the protein, a gelatinous precipitate of heavy metal hydroxide, the pH of the protein-containing liquor being from about 3.6 to about 4.5 during filtration.

2. In the process of recovering oleaginous seed protein from an aqueous alkaline solution thereof, which process comprises acidifying the solution to precipitate the protein, and filtering off the precipitated protein, the improvement which comprises adding to the protein-containing liquor, at any time subsequent to the beginning of precipitation of the protein but prior to filtration, a heavy-metal-containing inorganic salt forming a gelatinous precipitate in the acid liquor in which the protein is precipitated, the pH of the protein-containing liquor being from about 3.6 to about 4.5 during filtration.

3. In the process of recovering vegetable protein from an aqueous alkaline solution thereof, which process comprises acidifying the solution to precipitate the protein, and filtering off the precipitated protein, the improvement which comprises adding to the protein-containing liquor, at any time prior to filtration, a heavy-metal-containing inorganic salt substantially soluble in the alkaline solution of the protein but forming a gelatinous precipitate in the acid liquor in which the protein is precipitated, the pH of the protein-containing liquor being from about 3.6 to about 4.5 during filtration.

4. The process of claim 2 in which the salt is an iron salt.

5. The process of claim 2 in which the salt is a salt of trivalent iron.

6. The process of claim 2 in which the salt is ferric chloride.

7. The process of claim 3 in which the salt is an aluminum salt.

8. The process of claim 3 in which the salt is aluminum sulfate.

9. The process of claim 3 in which the salt is aluminum chloride.

10. In the process of recovering oleaginous seed protein from an aqueous alkaline solution thereof which comprises acidifying the said solution to a pH of from about 3.6 to about 4.5, to precipitate the protein, concentrating the resulting slurry to a protein-solids content of from about 4 per cent to about 12 per cent by weight, and filtering off the precipitated protein, the improvement which comprises adding to the protein-containing liquor, at any stage in the process prior to the filtration, an amount of aluminum sulfate equal to between 0.5 per cent and 15 per cent of the dry weight of protein present and thereafter prior to filtration readjusting the pH to between about 3.6 and about 4.5.

11. In the process of recovering oleaginous seed protein from an aqueous solution thereof in caustic soda which comprises acidifying the said solution to a pH of from about 3.6 to about 4.5, to precipitate the protein, concentrating the resulting slurry to a protein-solids content of from about 4 per cent to about 12 per cent by weight, and filtering off the precipitated protein, the improvement which comprises adding to the protein-containing liquor at any stage in the process not less than 5 minutes prior to filtration, an amount of aluminum sulfate equal to between 0.5 per cent and 15 per cent of the dry weight of the protein present and in the form of an aqueous solution at least one hour in age, and thereafter prior to filtration readjusting the pH to between about 3.6 and about 4.5.

12. The process of recovering protein from substantially oil-free oleaginous seed material which comprises extracting the said material with an aqueous alkaline solution containing an alkali metal salt of an amphoteric hydroxide substantially soluble in the aqueous alkaline solution of the protein but forming a gelatinous procipitate at the pH at which protein is precipitated, separating the protein-containing solution from undissolved material, adjusting the pH of the solution to a value of from about 3.6 to about 4.5 to precipitate the protein, and filtering, the protein-containing liquor being within the aforesaid pH limits during filtration.

STEWART ROWE.

REFERENCES CITED

The following references are of record in the file of this patent:

UNITED STATES PATENTS

| Number | Name | Date |
|---|---|---|
| 313,665 | Greene | Mar. 10, 1885 |
| 354,650 | Morrison et al. | Dec. 21, 1886 |
| 1,027,967 | Zuckmayer | May 28, 1912 |
| 1,036,405 | Zuckmayer | Aug. 20, 1912 |
| 2,415,426 | Henning | Feb. 11, 1947 |

OTHER REFERENCES

Partington, "Text-book of Inorganic Chemistry," 5th ed., MacMillan and Co. (London), 1937, page 878.